US012466206B2

(12) United States Patent
Oh et al.

(10) Patent No.: US 12,466,206 B2
(45) Date of Patent: Nov. 11, 2025

(54) SUBSTRATE PROCESSING APPARATUS CONTROL SYSTEM AND SUBSTRATE PROCESSING APPARATUS CONTROL METHOD

(71) Applicant: SEMES CO., LTD., Cheonan-si (KR)

(72) Inventors: Beomjeong Oh, Cheonan-si (KR); Jong Nam Na, Yangju-si (KR)

(73) Assignee: SEMES CO., LTD., Cheonan-si (KR)

(*) Notice: Subject to any disclaimer, the term of this patent is extended or adjusted under 35 U.S.C. 154(b) by 105 days.

(21) Appl. No.: 18/495,494

(22) Filed: Oct. 26, 2023

(65) Prior Publication Data

US 2024/0149599 A1 May 9, 2024

(30) Foreign Application Priority Data

Nov. 8, 2022 (KR) ........................ 10-2022-0148288

(51) Int. Cl.
*B41J 2/045* (2006.01)
*B41J 29/393* (2006.01)

(52) U.S. Cl.
CPC ......... *B41J 29/393* (2013.01); *B41J 2/04505* (2013.01)

(58) Field of Classification Search
CPC ................ B41J 2/04505; B41J 2/04501; B41J 2/04508; B41J 2/01; B41J 2/11; B41J 3/407; B41J 11/001; B41J 29/393; G02F 1/1303
See application file for complete search history.

(56) References Cited

U.S. PATENT DOCUMENTS

2006/0132530 A1* 6/2006 Yasuda .................. B41J 29/393 347/19

FOREIGN PATENT DOCUMENTS

| | | | |
|---|---|---|---|
| JP | H08-25699 A | 1/1996 |
| JP | 2004-337727 A | 12/2004 |
| JP | 2008-123993 A | 5/2008 |
| KR | 10-2005-0029744 A | 3/2005 |
| KR | 10-1078663 B1 | 11/2011 |

OTHER PUBLICATIONS

Office Action dated Jul. 30, 2024, for the corresponding Korean Patent Application No. 10-2022-0148288.

* cited by examiner

*Primary Examiner* — Kristal Feggins
(74) *Attorney, Agent, or Firm* — Muir Patent Law, PLLC

(57) ABSTRACT

Provided is a substrate processing apparatus control system and substrate processing apparatus control method, the substrate processing apparatus control system including an image generator for generating an image to be printed by a substrate processing apparatus including an inkjet head unit to print the image on a substrate in an inkjet printing manner, a jetting driver for receiving an image signal from the image generator and outputting a jetting signal to the inkjet head unit to allow the substrate processing apparatus to print the image on the substrate based on the image signal, and a motion controller for controlling operation of a stage unit for supporting and moving the substrate in the substrate processing apparatus.

18 Claims, 5 Drawing Sheets

FIG. 3

| | | | | | | | | | | | |
|---|---|---|---|---|---|---|---|---|---|---|---|
| ENCODER COUNT VALUE | 0 | 1000 | 2000 | 3000 | 4000 | 5000 | 6000 | 7000 | 8000 | 9000 | 10000 |
| JETTING SIGNAL | ↑ | ↑ | ↑ | ↑ | ↑ | ↑ | ↑ | ↑ | ↑ | ↑ | ↑ |

WHEN JETTING DRIVER CORRECTS POSITION ERROR

- ENCODER RESOLUTION: 0.1μm, D2D: 100 μm
- 10μm ERROR OCCURS IN 0~1 MM PERIOD WHEN PRIMARY LINER CORRECTION IS APPLIED

| | | | | | | | | | | | |
|---|---|---|---|---|---|---|---|---|---|---|---|
| LINEARLY CORRECTED ENCODER COUNT VALUE | 0 | 1010 | 2020 | 3030 | 4040 | 5050 | 6060 | 7070 | 8080 | 9090 | 10100 |
| JETTING SIGNAL | ↑ | ↑ | ↑ | ↑ | ↑ | ↑ | ↑ | ↑ | ↑ | ↑ | ↑ |

SUBSTRATE PROCESSING APPARATUS CONTROL SYSTEM AND SUBSTRATE PROCESSING APPARATUS CONTROL METHOD

CROSS-REFERENCE TO RELATED PATENT APPLICATION

This application claims the benefit of Korean Patent Application No. 10-2022-0148288, filed on Nov. 8, 2022, in the Korean Intellectual Property Office, the disclosure of which is incorporated herein in its entirety by reference.

BACKGROUND OF THE INVENTION

1. Field of the Invention

The present invention relates to a substrate processing apparatus control system and a substrate processing apparatus control method and, more particularly, to a substrate processing apparatus control system and substrate processing apparatus control method capable of printing an image on a substrate in an inkjet printing manner.

2. Description of the Related Art

Liquid crystal displays (LCDs) are commonly used as displays of electronic devices. In general, the LCD includes an array substrate and a color filter substrate. The array substrate includes a thin film transistor (TFT), a pixel electrode, and an alignment layer. The color filter substrate includes a black matrix (BM), a color filter (CF), a common electrode, and an alignment layer. Liquid crystals are positioned in a space between the array substrate and the color filter substrate. The above-described LCD achieves an image effect by using the difference in refractive index of light based on the anisotropy of the liquid crystals.

An inkjet-type liquid coating unit is used to apply a treatment liquid such as an alignment solution or liquid crystals onto the substrate in order to manufacture the LCDs. The liquid coating unit includes a head for applying the treatment liquid onto the substrate, and the head includes nozzles for ejecting the treatment liquid. As such, the treatment liquid ejected from the nozzles may land on the substrate.

For accurate R/G/B patterning in the inkjet system, a correction process for solving a mechanical defect of a substrate processing apparatus is essentially required to correct and suppress an error which influences the landing of individual droplets on the substrate on a transfer path of a stage for transferring the substrate.

However, in the above-described substrate processing apparatus control system and substrate processing apparatus control method, position error correction is performed to correct a landing error by using a motion controller based on an encoder signal generated in a feed forward manner and provided by a controller, but an error still exists between the encoder signal and an actual position due to a following error based on a control sampling cycle.

For example, after the encoder signal of the stage is input to the motion controller, a sum value of a position correction value and an output signal for controlling the stage is converted into an encoder signal and input to a jetting driver. Because the output signal is delayed by the control sampling cycle of the motion controller and, particularly, the following error unavoidably exists, an error may occur compared to an actual stage position.

In addition, a position error correction method based on a pattern image may increase a pattern generation calculation time for correcting a position error due to the dependency on an image resolution. For example, when a pattern image resolution is increased at the same printing speed to correct the position error, a limitation of implementation (e.g., an increase in pattern image calculation speed is caused when a high-resolution image is generated) occurs due to a jetting frequency limitation of the head or an image size limitation (e.g., 2G Byte).

SUMMARY OF THE INVENTION

The present invention provides a substrate processing apparatus control system and substrate processing apparatus control method capable of reflecting an actual position without being influenced by a control sampling cycle and a following error by providing a linear position correction function to a jetting driver and allowing the jetting driver to linearly reflect a position correction value when an encoder signal of a stage is directly received and the encoder signal is counted. However, the above description is an example, and the scope of the present invention is not limited thereto.

According to an aspect of the present invention, there is provided a substrate processing apparatus control system including an image generator for generating an image to be printed by a substrate processing apparatus including an inkjet head unit to print the image on a substrate in an inkjet printing manner, a jetting driver for receiving an image signal from the image generator and outputting a jetting signal to the inkjet head unit to allow the substrate processing apparatus to print the image on the substrate based on the image signal, and a motion controller for controlling operation of a stage unit for supporting and moving the substrate in the substrate processing apparatus, wherein the jetting driver receives an encoder signal output from an encoder of the stage unit, directly from the encoder and outputs the jetting signal to the inkjet head unit by counting the received encoder signal to control a jetting timing of the inkjet head unit based on a position of the stage unit.

The jetting driver may receive the encoder signal in a form of a pulse signal from the encoder of the stage unit.

The jetting driver may correct a count value of the encoder signal received in the form of the pulse signal by using a position correction value previously input and output the jetting signal to the inkjet head unit based on the corrected count value to correct a position error of the stage unit.

The jetting driver may linearly reflect the position correction value to the count value of the encoder signal to correct each count value of the encoder signal over time to an accumulated form of the position correction value.

The jetting driver may include an encoder divider for dividing the encoder signal received from the encoder of the stage unit, at a certain division interval, an encoder counter for counting the encoder signal divided at the certain division interval by the encoder divider, and a jetting controller for outputting the jetting signal to the inkjet head unit based on a count value of the encoder signal counted by the encoder counter.

The jetting controller may include a position corrector for correcting the count value of the encoder signal counted by the encoder counter, to output the jetting signal to the inkjet head unit based on the count value corrected by using the position correction value.

The position corrector may previously calculate and store a certain error having occurred during a certain interval set with respect to a printing direction, as the position correction value to sample a position error.

The position corrector may correct the count value of the encoder signal as shown in [Equation 1] X=Y+(n×a) (where X: Corrected Encoder Count Value, Y: Encoder Count Value Before Correction, n: Count Value Number, and a: Position Correction Value) to linearly reflect the position correction value to the count value of the encoder signal counted by the encoder counter.

The jetting controller may output a latch signal based on setting of a drop interval, head data for distributing the image signal for nozzles of the inkjet head unit, and a waveform signal obtained by converting an electrical signal for driving the nozzles, into a waveform, as the jetting signal.

The image generator may include a pattern controller for generating an image to be printed, as the image signal, and a hub for transmitting the image signal generated by the pattern controller, to the jetting driver.

According to another aspect of the present invention, there is provided a substrate processing apparatus control method including an image generation step for generating an image to be printed by a substrate processing apparatus including an inkjet head unit to print the image a substrate in an inkjet printing manner, a motion control step for controlling operation of a stage unit for supporting and moving the substrate in the substrate processing apparatus, a jetting signal output step for outputting a jetting signal to the inkjet head unit to allow the substrate processing apparatus to print the image on the substrate based on an image signal generated in the image generation step, a head driving step for controlling driving of the inkjet head unit based on the jetting signal, and a printing step for printing the substrate based on the driving of the inkjet head unit, wherein, in the jetting signal output step, an encoder signal output from an encoder of the stage unit is directly received from the encoder and the jetting signal is output to the inkjet head unit by counting the received encoder signal to control a jetting timing of the inkjet head unit based on a position of the stage unit.

In the jetting signal output step, the encoder signal may be received in a form of a pulse signal from the encoder of the stage unit driven by the motion control step.

In the jetting signal output step, a count value of the encoder signal received in the form of the pulse signal may be corrected by using a position correction value previously input and the jetting signal may be output to the inkjet head unit based on the corrected count value to correct a position error of the stage unit.

In the jetting signal output step, the position correction value may be linearly reflected to the count value of the encoder signal to correct each count value of the encoder signal over time to an accumulated form of the position correction value.

The jetting signal output step may include an encoder division step for dividing the encoder signal received from the encoder of the stage unit, at a certain division interval, an encoder counting step for counting the encoder signal divided at the certain division interval in the encoder division step, and a jetting control step for outputting the jetting signal to the inkjet head unit based on a count value of the encoder signal counted in the encoder counting step.

The jetting control step may include a position correction step for correcting the count value of the encoder signal counted in the encoder counting step, to output the jetting signal to the inkjet head unit based on the count value corrected by using the position correction value.

In the position correction step, a certain error having occurred during a certain interval set with respect to a printing direction may be previously calculated and stored as the position correction value to sample a position error.

In the position correction step, the count value of the encoder signal may be corrected as shown in [Equation 1] X=Y+(n×a) (where X: Corrected Encoder Count Value, Y: Encoder Count Value Before Correction, n: Count Value Number, and a: Position Correction Value) to linearly reflect the position correction value to the count value of the encoder signal counted in the encoder counting step.

In the jetting control step, a latch signal based on setting of a drop interval, head data for distributing the image signal for nozzles of the inkjet head unit, and a waveform signal obtained by converting an electrical signal for driving the nozzles, into a waveform may be output as the jetting signal.

According to another aspect of the present invention, there is provided a substrate processing apparatus control system including an image generator for generating an image to be printed by a substrate processing apparatus including an inkjet head unit to print the image on a substrate in an inkjet printing manner, a jetting driver for receiving an image signal from the image generator and outputting a jetting signal to the inkjet head unit to allow the substrate processing apparatus to print the image on the substrate based on the image signal, wherein the jetting driver receives an encoder signal output in a form of a pulse signal from an encoder of a stage unit, directly from the encoder and outputs the jetting signal to the inkjet head unit by counting the received encoder signal to control a jetting timing of the inkjet head unit based on a position of the stage unit, and a motion controller for controlling operation of the stage unit for supporting and moving the substrate in the substrate processing apparatus, wherein the jetting driver includes an encoder divider for dividing the encoder signal received from the encoder of the stage unit, at a certain division interval to correct a position error of the stage unit by correcting a count value of the encoder signal received in the form of the pulse signal by using a position correction value previously input and outputting the jetting signal to the inkjet head unit based on the corrected count value, and to correct each count value of the encoder signal over time to an accumulated form of the position correction value by linearly reflecting the position correction value to the count value of the encoder signal, an encoder counter for counting the encoder signal divided at the certain division interval by the encoder divider, and a jetting controller for outputting the jetting signal to the inkjet head unit based on a count value of the encoder signal counted by the encoder counter, wherein the jetting controller includes a position corrector for correcting the count value of the encoder signal counted by the encoder counter, to output the jetting signal to the inkjet head unit based on the count value corrected by using the position correction value, and wherein the position corrector previously calculates and stores a certain error having occurred during a certain interval set with respect to a printing direction, as the position correction value to sample a position error, and corrects the count value of the encoder signal as shown in [Equation 1] X=Y+(n×a) (where X: Corrected Encoder Count Value, Y: Encoder Count Value Before Correction, n: Count Value Number, and a: Position Correction Value) to linearly reflect the position correction value to the count value of the encoder signal counted by the encoder counter.

BRIEF DESCRIPTION OF THE DRAWINGS

The above and other features and advantages of the present invention will become more apparent by describing in detail embodiments thereof with reference to the attached drawings in which:

FIG. 3 is a table showing an embodiment for linearly reflecting a position correction value to a count value of an encoder signal by the jetting driver of FIG. 2;

DETAILED DESCRIPTION OF THE INVENTION

Figure 1:
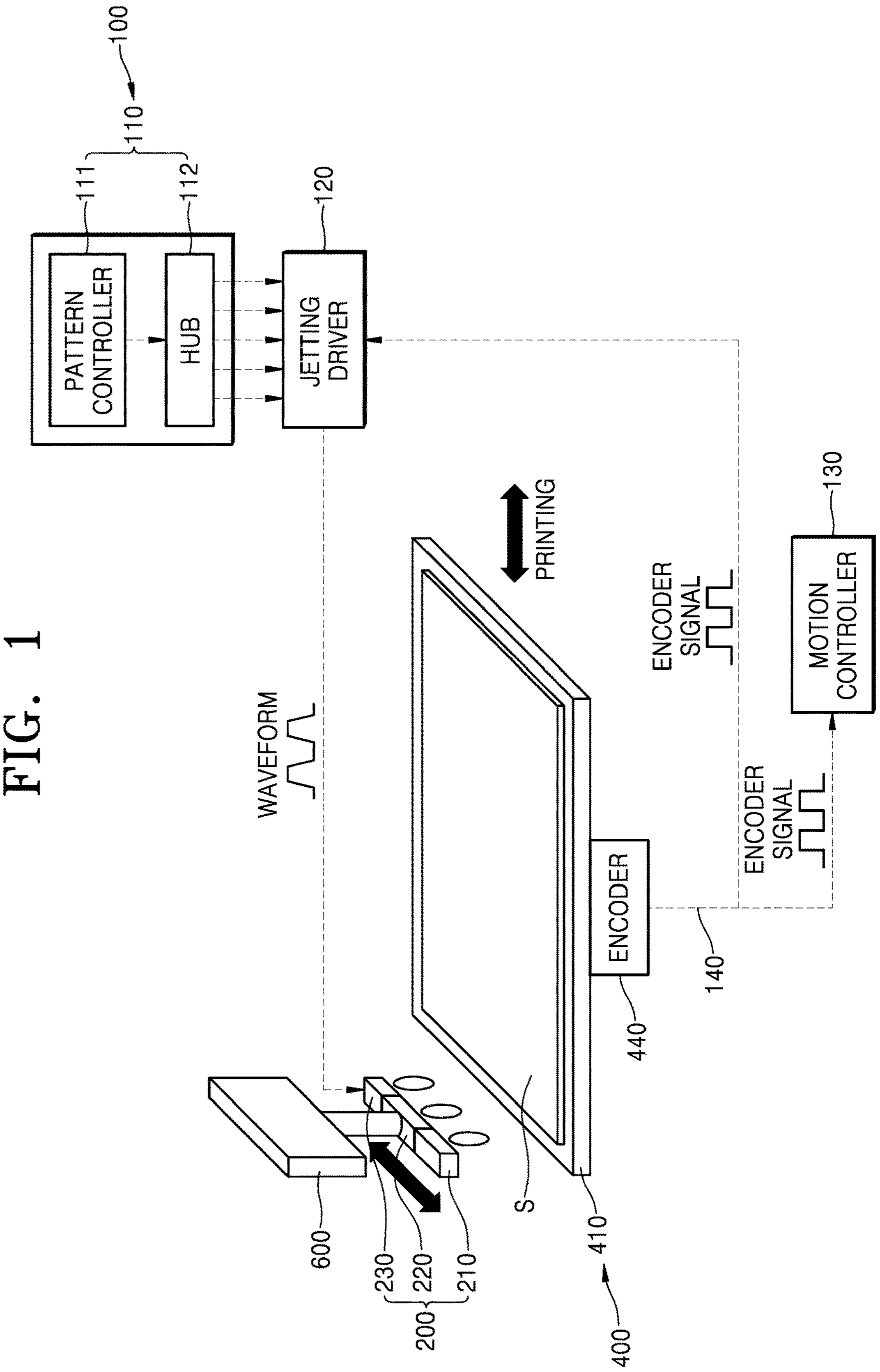
FIG. 1 is a conceptual view of a substrate processing apparatus control system according to an embodiment of the present invention.

Hereinafter, the present invention will be described in detail by explaining embodiments of the invention with reference to the attached drawings.

The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the thicknesses or sizes of layers are exaggerated for clarity and convenience of explanation.

Embodiments of the invention are described herein with reference to schematic illustrations of idealized embodiments (and intermediate structures) of the invention. As such, variations from the shapes of the illustrations as a result, for example, of manufacturing techniques and/or tolerances, are to be expected. Thus, the embodiments of the invention should not be construed as limited to the particular shapes of regions illustrated herein, but are to include deviations in shapes that result, for example, from manufacturing.

Figure 2:
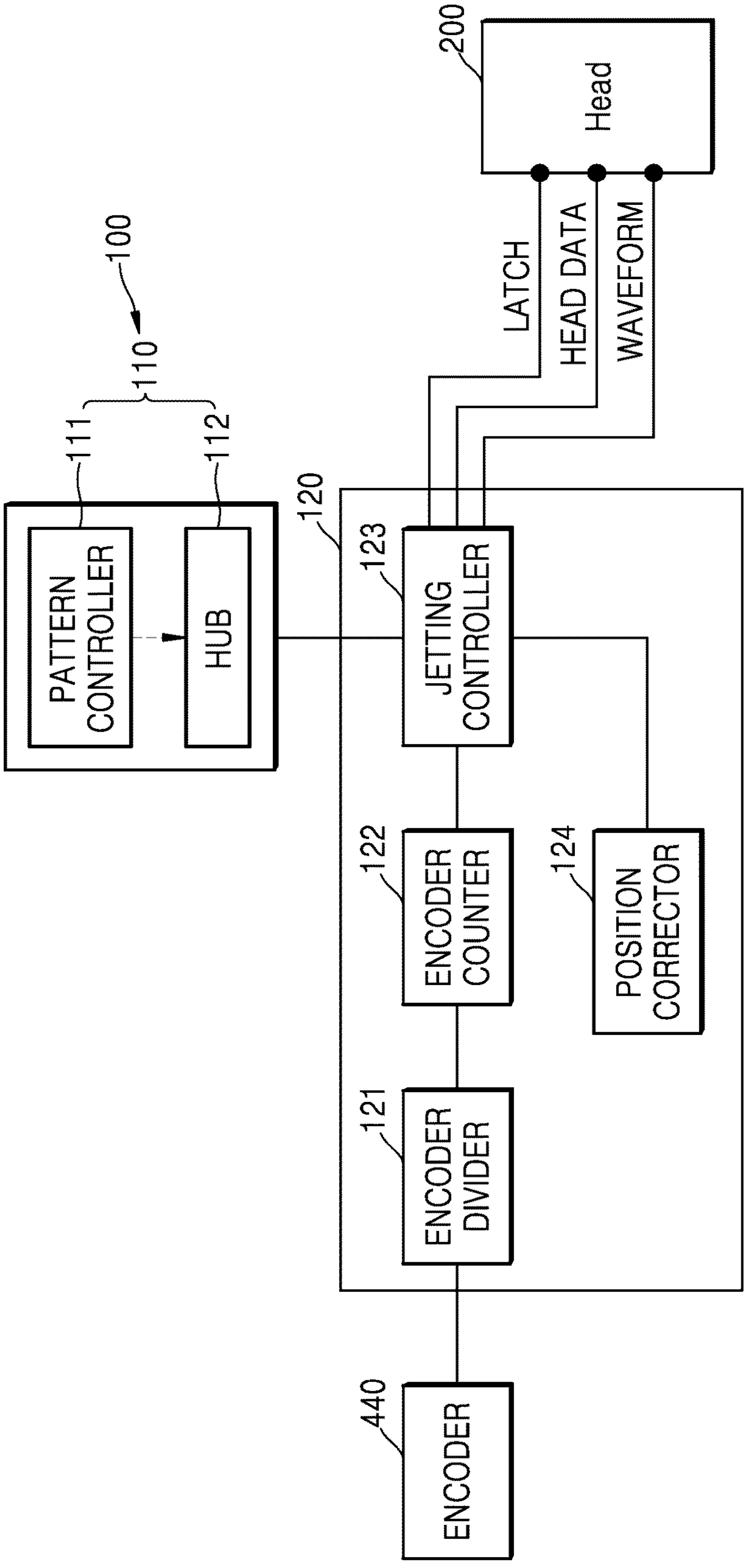
FIG. 2 is a block diagram of a jetting driver of the substrate processing apparatus control system of FIG. 1.

FIG. 1 is a conceptual view of a substrate processing apparatus control system 100 according to an embodiment of the present invention, FIG. 2 is a block diagram of a jetting driver 120 of the substrate processing apparatus control system 100 of FIG. 1, and FIG. 3 is a table showing an embodiment for linearly reflecting a position correction value to a count value of an encoder signal by the jetting driver 120 of FIG. 2.

Initially, as shown in FIG. 1, the substrate processing apparatus control system 100 according to an embodiment of the present invention may mainly include an image generator 110, the jetting driver 120, and a motion controller 130.

The image generator 110 may generate an image to be printed by a substrate processing apparatus 1000 (see FIG. 4) including an inkjet head unit 200 to print the image on a substrate S in an inkjet printing manner.

Specifically, the image generator 110 may include a pattern controller 111 and a hub 112.

The pattern controller 111 may generate an image to be printed, as an image signal. The image signal generated by the pattern controller 111 may be transmitted to the hub 112, and the hub 112 may transmit the image signal generated by the pattern controller 111, to the jetting driver 120 to be described below.

The jetting driver 120 may receive the image signal from the hub 112 of the image generator 110 and output a jetting signal to the inkjet head unit 200 to allow the substrate processing apparatus 1000 to print the image on the substrate S based on the image signal, and the motion controller 130 may control operation of a stage unit 400 for supporting and moving the substrate S in the substrate processing apparatus 1000.

For example, the jetting driver 120 may control driving of the inkjet head unit 200 based on the image signal. Although not shown in the drawings, the jetting driver 120 may include a plurality of jetting drivers one-to-one corresponding to a plurality of printheads 210, 220, and 230 included in the inkjet head unit 200. That is, one jetting driver 120 may control driving of one printhead. However, the above-described correspondence between the jetting driver 120 and the inkjet head unit 200 is merely an example, and the scope of the present invention is not limited thereto.

The jetting driver 120 may receive an encoder signal output from an encoder 440 of the stage unit 400, directly from the encoder 440 and output the jetting signal to the inkjet head unit 200 by counting the received encoder signal to control a jetting timing of the inkjet head unit 200 based on a position of the stage unit 400.

To this end, the jetting driver 120 may be directly connected to the encoder 440 of the stage unit 400 through a field bus 140. For example, the field bus 140 may bidirectionally transmit signals between the encoder 440 and the jetting driver 120 and between the encoder 440 and the motion controller 130. Specifically, the field bus 140 may be a network system capable of bidirectional communication.

As such, signals may be shared between the encoder 440 of the stage unit 400 and the jetting driver 120 or the motion controller 130 by the field bus 140. That is, the encoder 440 may transmit or receive signals to or from the jetting driver 120 and the motion controller 130 through the field bus 140.

As described above, the jetting driver 120 may receive the encoder signal in the form of a pulse signal from the encoder 440 of the stage unit 400 through the field bus 140. When the jetting signal is output to the inkjet head unit 200, the jetting driver 120 may correct a count value of the encoder signal received in the form of a pulse signal by using a position correction value previously input and output the jetting signal to the inkjet head unit 200 based on the corrected count value to correct a position error of the stage unit 400.

Specifically, as shown in FIG. 2, the jetting driver 120 may include an encoder divider 121 for dividing the encoder signal received from the encoder 440 of the stage unit 400, at a certain division interval, an encoder counter 122 for counting the encoder signal divided at the certain division interval by the encoder divider 121, and a jetting controller 123 for outputting the jetting signal to the inkjet head unit 200 based on a count value of the encoder signal counted by the encoder counter 122.

Herein, the jetting controller 123 may include a position corrector 124 for correcting the count value of the encoder signal counted by the encoder counter 122, to output the jetting signal to the inkjet head unit 200 based on the count value corrected by using the position correction value.

Specifically, the position corrector 124 may previously calculate and store a certain error having occurred during a certain interval set with respect to a printing direction (e.g., a stage unit moving direction), as the position correction value to sample a position error, and correct the count value of the encoder signal as shown in [Equation 1] below to linearly reflect the position correction value to the count value of the encoder signal counted by the encoder counter 122.

$$X=Y+(n\times a) \qquad \text{[Equation 1]}$$

X: Corrected Encoder Count Value

Y: Encoder Count Value Before Correction n: Count Value Number a: Position Correction Value For example, as shown in the embodiment of FIG. 3 for linearly reflecting the position correction value to the count value of the encoder signal, when an encoder resolution is 0.1 μm, an interval between drops in the printing direction is 100 μm, a position error is sampled under a 1 mm interval condition, and a 10 μm error has occurred, 10 μm may be previously stored as the position correction value in the position corrector 124. Thus, as shown in FIG. 3, the position corrector 124 of the jetting driver 120 may linearly reflect the position correction value stored as 10 μm to the count value of the encoder signal to correct each count value of the encoder signal over time to an accumulated form of the position correction value.

As such, ultimately, the jetting controller 123 of the jetting driver 120 may output a latch signal based on setting of a drop interval, head data for distributing the image signal for nozzles of the printheads 210, 220, and 230 of the inkjet head unit 200, and a waveform signal obtained by converting an electrical signal for driving the nozzles, into a waveform, as the jetting signal based on the corrected count value of the encoder signal.

Figure 4:
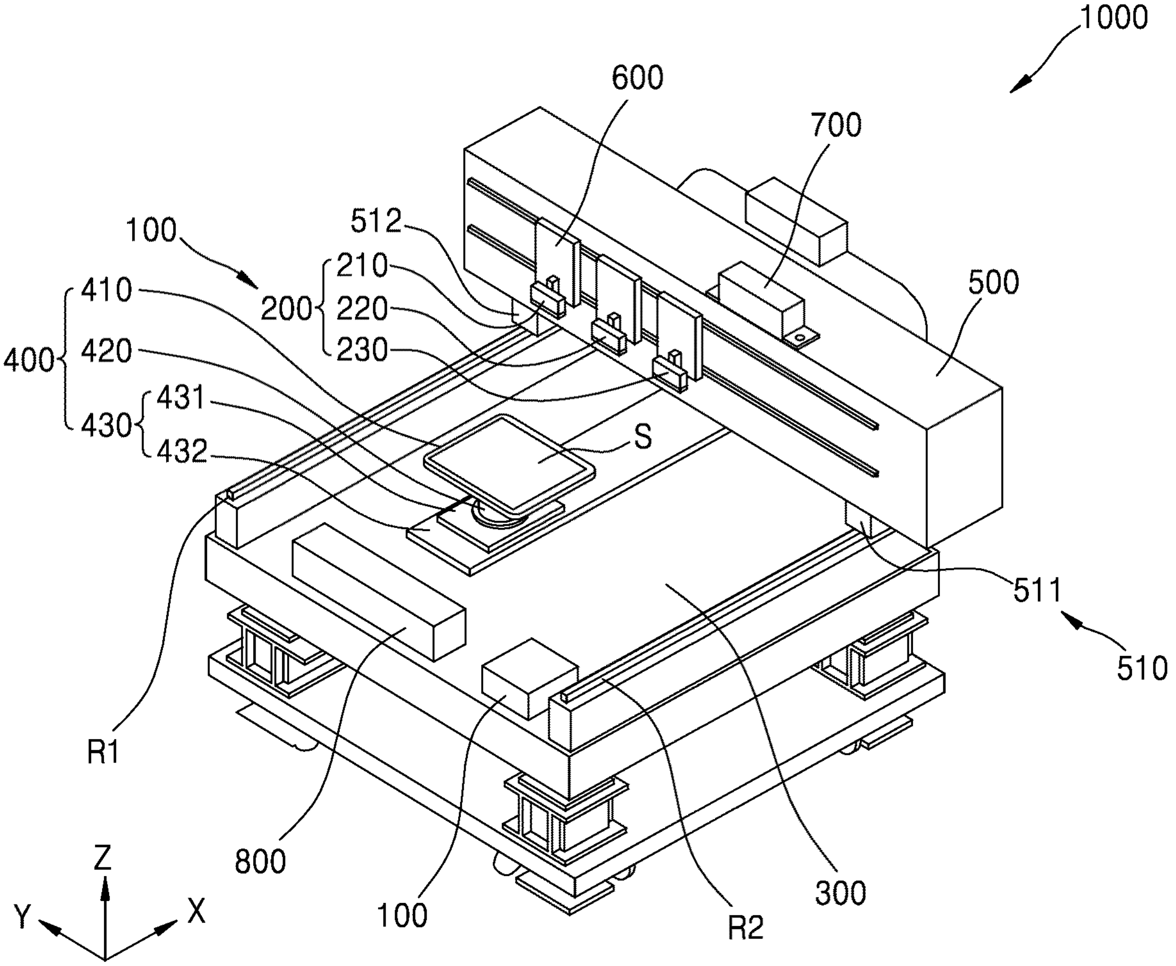
FIG. 4 is a perspective view of a substrate processing apparatus to which the substrate processing apparatus control system of FIG. 1 is applied.

FIG. 4 is a perspective view of the substrate processing apparatus 1000 to which the substrate processing apparatus control system 100 of FIG. 1 is applied.

As shown in FIG. 4, the substrate processing apparatus 1000 including the substrate processing apparatus control system 100 according to an embodiment of the present invention may mainly include the inkjet head unit 200, a base 300, the stage unit 400, a gantry unit 500, a head moving unit 600, and a droplet supply module 700, and a suction unit 800.

As shown in FIG. 4, the base 300 may be provided in a rectangular parallelepiped shape having a certain thickness. The stage unit 400 and the gantry unit 500 may be mounted on an upper surface of the base 300. Specifically, the base 300 may be a structure having an appropriate strength and durability to support the stage unit 400 and the gantry unit 500. For example, the base 300 may be a structure made of one or more of steel, stainless steel, aluminum, magnesium, and zinc. However, the base 300 is not limited to the illustration of FIG. 4 and members of various shapes and materials capable of supporting the stage unit 400 and the gantry unit 500 may be used.

The stage unit 400 may be mounted on the base 300 to support the substrate S. Specifically, the stage unit 400 may include a flat plate-shaped stage 410 on which the substrate S is seated.

The stage unit 400 may include a rotary driving member 420 connected to a lower surface of the stage 410. The rotary driving member 420 is a type of rotary motor and may rotate the stage 410 about a central axis of rotation perpendicular to the stage 410.

For example, when the stage 410 is rotated by the rotary driving member 420, the substrate S may also be rotated by the rotation of the stage 410. When a long side direction of cells provided on the substrate S to be applied with droplets by the inkjet head unit 200 faces a Y-axis direction Y, the rotary driving member 420 may rotate the substrate S in such a manner that the long side direction of the cells faces an X-axis direction X.

The stage 410 and the rotary driving member 420 may be linearly moved in the X-axis direction X by a linear driving member 430. Specifically, the linear driving member 430 may include a slider 431 and a guide member 432, and the rotary driving member 420 may be mounted on an upper surface of the slider 431.

For example, the guide member 432 may extend along the X-axis direction X in the middle of the upper surface of the base 300. A linear motor (not shown) including the above-described encoder 440 may be embedded in the slider 431, and the slider 431 may be moved in the X-axis direction X along the guide member 432 by the driving of the linear motor.

The gantry unit 500 may be mounted above a path along which the stage 410 of the stage unit 400 is moved. The gantry unit 500 may be spaced apart from the upper surface of the base 300 in an upward direction, and disposed in such a manner that a longitudinal direction thereof faces the Y-axis direction Y.

Gantry movers 510 mounted under both sides of the gantry unit 500 may linearly move the gantry unit 500 in the X-axis direction X. The gantry movers 510 may include a first moving unit 511 mounted under an end of the gantry unit 500, and a second moving unit 512 mounted under another end of the gantry unit 500 to face the first moving unit 511.

Specifically, the first moving unit 511 may slide along a guide rail R2 mounted at a side of the base 300 and the second moving unit 512 may slide along a guide rail R1 mounted at another side of the base 300, thereby linearly moving the gantry unit 500 in the X-axis direction X.

The inkjet head unit 200 may be coupled to the gantry unit 500 by the head moving unit 600. The inkjet head unit 200 may be linearly moved in the longitudinal direction of the gantry unit 500, i.e., the Y-axis direction Y, by the head moving unit 600, and also linearly moved in a Z-axis direction Z. The inkjet head unit 200 may rotate about an axis parallel to the Z-axis direction Z with respect to the head moving unit 600.

The inkjet head unit 200 may receive droplets through the droplet supply module 700 mounted on the gantry unit 500. For example, the droplet supply module 700 may receive droplets from an external droplet supply device (not shown) and supply the same to the inkjet head unit 200 at a certain pressure.

The inkjet head unit 200 may be mounted on the base 300 to eject the droplets onto the substrate S in an inkjet printing manner and print the image on the substrate S.

In this case, the inkjet head unit 200 may include a plurality of printheads. For example, the inkjet head unit 200 may include a first printhead 210, a second printhead 220, and a third printhead 230. The inkjet head unit 200 including the plurality of printheads 210, 220, and 230 may be coupled to the gantry unit 500 in a row along the Y-axis direction Y.

Herein, although the inkjet head unit 200 includes the first, second, and third printheads 210, 220, and 230 in FIG. 4, the inkjet head unit 200 is not limited thereto and may include various numbers of printheads based on process requirements. The printheads 210, 220, and 230 of the inkjet head unit 200 may be maintained by ejecting the droplets through the suction unit 800 mounted at a side of the base 300.

A substrate processing apparatus control method in the above-described substrate processing apparatus 1000 including the substrate processing apparatus control system 100 will now be described in detail.

Figure 5:
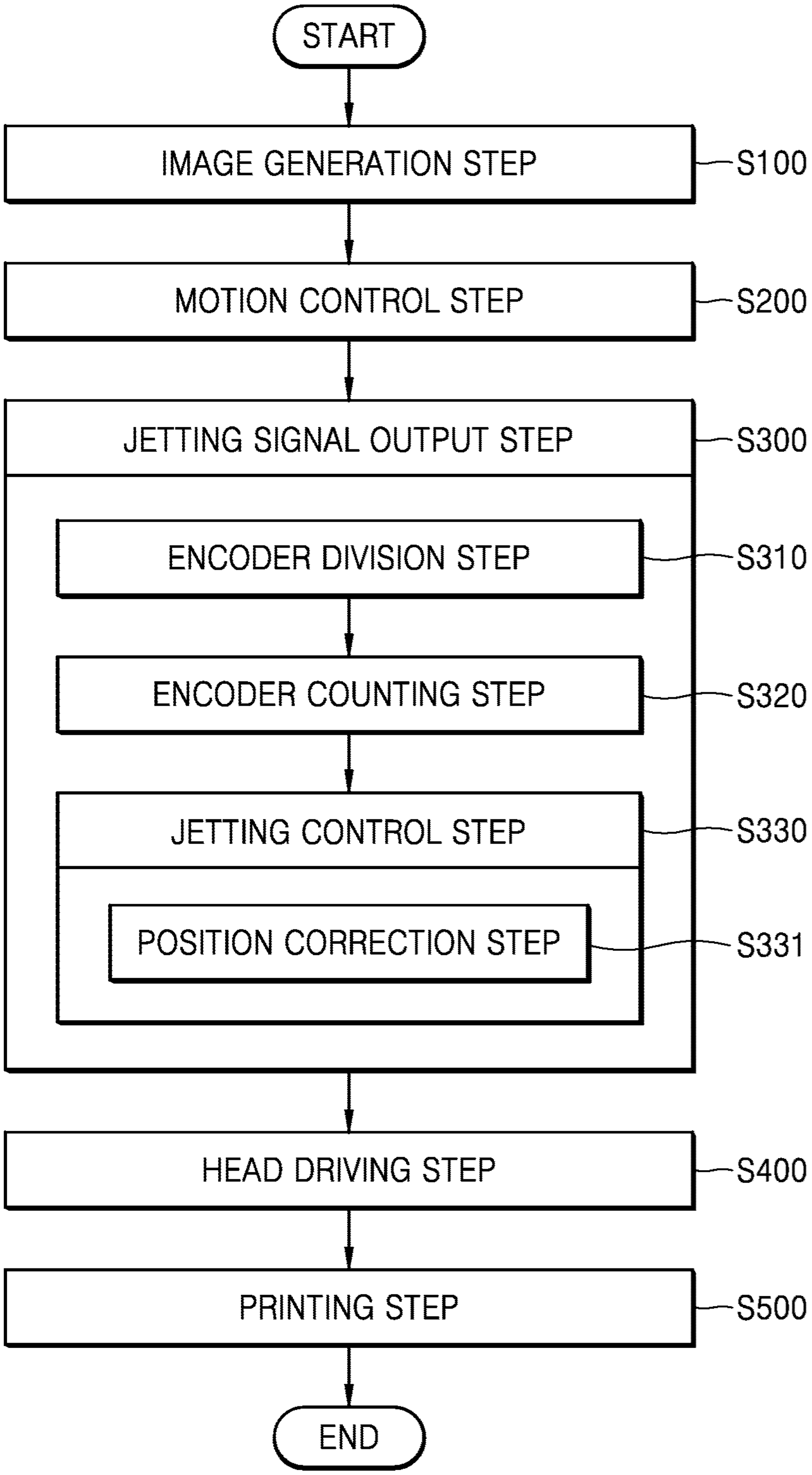
FIG. 5 is a flowchart of a substrate processing apparatus control method according to another embodiment of the present invention.

FIG. 5 is a flowchart of a substrate processing apparatus control method according to another embodiment of the present invention.

Referring to FIG. 5, the substrate processing apparatus control method according to another embodiment of the present invention may mainly include an image generation step S100, a motion control step S200, a jetting signal output step S300, a head driving step S400, and a printing step S500.

Initially, in the image generation step S100, an image to be printed by the substrate processing apparatus 1000 including the inkjet head unit 200 may be generated to print the image on a substrate S in an inkjet printing manner.

Then, in the motion control step S200, operation of the stage unit 400 for supporting and moving the substrate S in the substrate processing apparatus 1000 may be controlled and, in the jetting signal output step S300, a jetting signal may be output to the inkjet head unit 200 to allow the substrate processing apparatus 1000 to print the image on the substrate S based on an image signal generated in the image generation step S100.

In the jetting signal output step S300, an encoder signal output from the encoder 440 of the stage unit 400 may be received directly from the encoder 440 and the jetting signal may be output to the inkjet head unit 200 by counting the received encoder signal to control a jetting timing of the inkjet head unit 200 based on a position of the stage unit 400.

For example, in the jetting signal output step S300, the encoder signal may be received in the form of a pulse signal from the encoder 440 of the stage unit 400 driven by the motion control step S200, and a count value of the encoder signal received in the form of a pulse signal may be corrected by using a position correction value previously input and the jetting signal may be output to the inkjet head unit 200 based on the corrected count value to correct a position error of the stage unit 400.

Specifically, the jetting signal output step S300 may include an encoder division step S310 for dividing the encoder signal received from the encoder 440 of the stage unit 400, at a certain division interval, an encoder counting step S320 for counting the encoder signal divided at the certain division interval in the encoder division step S310, and a jetting control step S330 for outputting the jetting signal the inkjet head unit 200 based on a count value of the encoder signal counted in the encoder counting step S320.

Herein, the jetting control step S330 may include a position correction step S331 for correcting the count value of the encoder signal counted in the encoder counting step S320, to output the jetting signal to the inkjet head unit 200 based on the count value corrected by using the position correction value and, in the position correction step S331, a certain error having occurred during a certain interval set with respect to a printing direction may be previously calculated and stored as the position correction value to sample a position error, and the count value of the encoder signal may be corrected as shown in [Equation 1] above to linearly reflect the position correction value to the count value of the encoder signal counted in the encoder counting step S320.

As described above, in the jetting signal output step S300, a latch signal based on setting of a drop interval, head data for distributing the image signal for nozzles of the inkjet head unit 200, and a waveform signal obtained by converting an electrical signal for driving the nozzles, into a waveform may be output as the jetting signal based on the corrected count value of the encoder signal by linearly reflecting the position correction value to the count value of the encoder signal to correct each count value of the encoder signal over time to an accumulated form of the position correction value.

Then, as shown in FIG. 5, in the head driving step S400, driving of the inkjet head unit 200 may be controlled based on the jetting signal and, in the printing step S500, the substrate S may be printed based on the driving of the inkjet head unit 200.

Therefore, based on the substrate processing apparatus control system 100 and the substrate processing apparatus control method according to various embodiments of the present invention, the jetting driver 120 may receive an encoder signal output from the encoder 440 of the stage unit 400, directly from the encoder 440 and output a jetting signal to the inkjet head unit 200 by counting the received encoder signal to correct and control a jetting timing of the inkjet head unit 200 based on a position of the stage unit 400. At this time, a position error of the stage unit 400 may be corrected by correcting a count value of the encoder signal received in the form of a pulse signal by using a position correction value previously input and outputting the jetting signal to the inkjet head unit 200 based on the corrected count value. In this case, each count value of the encoder signal over time may be corrected to an accumulated form of the position correction value by linearly reflecting the position correction value to the count value of the encoder signal.

Therefore, an actual position may be reflected without being influenced by a control sampling cycle and a following error by providing a linear position correction function to the jetting driver 120 for receiving an encoder signal output from the encoder 440 of the stage unit 400, directly from the encoder 440 and by linearly reflecting a position correction value when the encoder signal is counted, and an advantageous printing speed may be achieved because an image resolution does not need to be increased to correct a position error and thus a reduction in calculation speed due to the increase in resolution of an image signal does not occur.

According to the afore-described embodiments of the present invention, to correct and control a jetting timing of an inkjet head unit based on a position of a stage unit, an encoder signal output from an encoder of the stage unit may be directly received from the encoder, and a jetting signal may be output to the inkjet head unit by counting the received encoder signal. At this time, a position error of the stage unit may be corrected by correcting a count value of the encoder signal received in the form of a pulse signal by using a position correction value previously input and outputting the jetting signal to the inkjet head unit based on the corrected count value. In this case, each count value of the encoder signal over time may be corrected to an accumulated form of the position correction value by linearly reflecting the position correction value to the count value of the encoder signal.

As described above, a substrate processing apparatus control system and substrate processing apparatus control method capable of reflecting an actual position without being influenced by a control sampling cycle and a following error by providing a linear position correction function to a jetting driver for receiving an encoder signal output from an encoder of a stage unit, directly from the encoder and by linearly reflecting a position correction value when the encoder signal is counted, and of achieving an advantageous printing speed because an image resolution does not need to be increased to correct a position error and thus a reduction in calculation speed due to the increase in resolution of an image signal does not occur may be implemented. However, the scope of the present invention is not limited to the above effects.

While the present invention has been particularly shown and described with reference to embodiments thereof, it will be understood by one of ordinary skill in the art that various changes in form and details may be made therein without departing from the scope of the present invention as defined by the following claims.

What is claimed is:

1. A substrate processing apparatus control system comprising:
 a stage unit configured to support and move a substrate in a substrate processing apparatus, the stage unit comprising an encoder;
 an inkjet head unit configured to print an image on the substrate in an inkjet printing manner;
 an image generator configured to generate the image to be printed by the inkjet head unit;
 a jetting driver configured to receive an image signal from the image generator and output a jetting signal to the inkjet head unit to allow the substrate processing apparatus to print the image on the substrate based on the image signal; and
 a motion controller configured to control operation of the stage unit,
 wherein the jetting driver is configured to receive an encoder signal output from the encoder of the stage unit, directly from the encoder, and output the jetting signal to the inkjet head unit by counting the encoder signal received from the encoder to control a jetting timing of the inkjet head unit based on a position of the stage unit, and
 wherein the jetting driver comprises:
  an encoder divider configured to divide, at a certain interval, the encoder signal received from the encoder of the stage unit,
  an encoder counter configured to count the encoder signal divided at the certain interval by the encoder divider; and
  a jetting controller configured to output the jetting signal to the inkjet head unit based on a count value of the encoder signal counted by the encoder counter.

2. The substrate processing apparatus control system of claim 1, wherein the jetting driver is further configured to receive the encoder signal in a form of a pulse signal from the encoder of the stage unit.

3. The substrate processing apparatus control system of claim 2, wherein the jetting driver is further configured to correct a count value of the encoder signal received in the form of the pulse signal by using a position correction value previously input and output the jetting signal to the inkjet head unit based on the corrected count value to correct a position error of the stage unit.

4. The substrate processing apparatus control system of claim 3, wherein the jetting driver is further configured to linearly reflect the position correction value to the count value of the encoder signal to correct each count value of the encoder signal over time to an accumulated form of the position correction value.

5. The substrate processing apparatus control system of claim 1, wherein the jetting controller comprises a position corrector configured to correct the count value of the encoder signal counted by the encoder counter, to output the jetting signal to the inkjet head unit based on the count value corrected by using the position correction value.

6. The substrate processing apparatus control system of claim 5, wherein the position corrector is further configured to calculate and store a certain error having occurred during a certain interval set with respect to a printing direction, as the position correction value to sample a position error.

7. The substrate processing apparatus control system of claim 6,
 wherein the position corrector is further configured to correct the count value of the encoder signal as shown in [Equation 1] below to linearly reflect the position correction value to the count value of the encoder signal counted by the encoder counter:

$$X=Y+(n\times a), \quad \text{[Equation 1]}$$

wherein X is a Corrected Encoder Count Value,
 wherein Y is an Encoder Count Value Before Correction,
 wherein n is a Count Value Number, and
 wherein a is a Position Correction Value.

8. The substrate processing apparatus control system of claim 1, wherein the jetting controller is configured to output a latch signal based on setting of a drop interval, head data for distributing the image signal for nozzles of the inkjet head unit, and a waveform signal obtained by converting an electrical signal into a waveform for driving the nozzles as the jetting signal.

9. The substrate processing apparatus control system of claim 1, wherein the image generator comprises:
 a pattern controller configured to generate the image to be printed, as the image signal; and
 a hub configured to transmit the image signal generated by the pattern controller, to the jetting driver.

10. A substrate processing apparatus control method comprising:
 generating an image to be printed by a substrate processing apparatus comprising an inkjet head unit to print the image on a substrate in an inkjet printing manner;
 controlling operation of a stage unit for supporting and moving the substrate in the substrate processing apparatus;
 outputting a jetting signal to the inkjet head unit to allow the substrate processing apparatus to print the image on the substrate based on an image signal generated by the substrate processing apparatus;
 controlling driving of the inkjet head unit based on the jetting signal; and
 printing the image on the substrate based on the driving of the inkjet head unit,
 wherein the outputting the jetting signal to the inkjet head unit comprises:
  receiving an encoder signal output from an encoder of the stage unit directly from the encoder,
  dividing the encoder signal received from the encoder of the stage unit, at a certain division interval;
  counting the encoder signal divided at the certain in division interval, and
  outputting the jetting signal to the inkjet head unit based on a count value of the counted encoder signal to control a jetting timing of the inkjet head unit based on a position of the stage unit.

11. The substrate processing apparatus control method of claim 10, wherein the outputting the jetting signal to the inkjet head unit further comprises:
 receiving the encoder signal in a form of a pulse signal from the encoder of the stage unit.

12. The substrate processing apparatus control method of claim 11, wherein the outputting the jetting signal to the inkjet head unit further comprises:

correcting a count value of the encoder signal that is received in the form of the pulse signal by using a position correction value previously input, and outputting the jetting signal to the inkjet head unit based on the corrected count value to correct a position error of the stage unit.

13. The substrate processing apparatus control method of claim 12, wherein; the outputting the jetting signal to the inkjet head unit further comprises:

linearly reflecting the position correction value to the count value of the encoder signal to correct each count value of the encoder signal over time to an accumulated form of the position correction value.

14. The substrate processing apparatus control method of claim 12, wherein the outputting the jetting signal to the inkjet head unit based on the count value of the counted encoder signal comprises:

correcting the count value of the counted encoder signal, to output the jetting signal to the inkjet head unit based on the count value corrected by using the position correction value.

15. The substrate processing apparatus control method of claim 14, wherein the correcting the count value of the counted encoder signal:

calculating a certain error having occurred during a certain interval set with respect to a printing direction, and storing the certain error as the position correction value to sample a position error.

16. The substrate processing apparatus control method of claim 15, wherein the count value of the encoder signal is corrected as shown in [Equation 1] below to linearly reflect the position correction value to the count value of the counted encoder signal:

$$X=Y+(n\times a), \quad \text{[Equation 1]}$$

wherein X is a Corrected Encoder Count Value, wherein Y is an Encoder Count Value Before Correction, wherein n is a Count Value Number, and wherein a is a Position Correction Value.

17. The substrate processing apparatus control method of claim 10, wherein the outputting the jetting signal to the inkjet head unit based on the count value of the counted encoder signal further comprises:

outputting a latch signal based on setting of a drop interval, head data for distributing the image signal for nozzles of the inkjet head unit, and a waveform signal obtained by converting an electrical signal for driving the nozzles, into a waveform t as the jetting signal.

18. A substrate processing apparatus control system comprising:

an image generator configured to generate an image to be printed by a substrate processing apparatus comprising an inkjet head unit to print the image on a substrate in an inkjet printing manner;

a jetting driver configured to receive an image signal from the image generator and output a jetting signal to the inkjet head unit to allow the substrate processing apparatus to print the image on the substrate based on the image signal, wherein the jetting driver is further configured to receive an encoder signal output in a form of a pulse signal from an encoder of a stage unit, directly from the encoder, and output the jetting signal to the inkjet head unit by counting the received encoder signal to control a jetting timing of the inkjet head unit based on a position of the stage unit; and a motion controller configured to control operation of the stage unit for supporting and moving the substrate in the substrate processing apparatus, wherein the jetting driver comprises:

an encoder divider configured to divide the encoder signal received from the encoder of the stage unit, at a certain division interval to correct a position error of the stage unit by correcting a count value of the encoder signal received in the form of the pulse signal by using a position correction value previously input, output the jetting signal to the inkjet head unit based on the corrected count value, and to correct each count value of the encoder signal over time to an accumulated form of the position correction value by linearly reflecting the position correction value to the count value of the encoder signal;

an encoder counter configured to count the encoder signal divided at the certain division interval by the encoder divider; and a jetting controller configured to output the jetting signal to the inkjet head unit based on a count value of the encoder signal counted by the encoder counter, wherein the jetting controller comprises a position corrector configured to correct the count value of the encoder signal counted by the encoder counter, and to output the jetting signal to the inkjet head unit based on the count value corrected by using the position correction value, and wherein the position corrector is further configured to calculate and store a certain error having occurred during a certain interval set with respect to a printing direction, as the position correction value to sample a position error, and correct the count value of the encoder signal as shown in [Equation 1] below to linearly reflect the position correction value to the count value of the encoder signal counted by the encoder counter, $$X=Y+(n\times a), \quad \text{[Equation 1]}$$

wherein X is a Corrected Encoder Count Value, wherein Y is an Encoder Count Value Before Correction, wherein n is a Count Value Number, and wherein a is a Position Correction Value.

* * * * *